United States Patent
Sasaki

(10) Patent No.: US 12,522,164 B2
(45) Date of Patent: Jan. 13, 2026

(54) ONBOARD EQUIPMENT ATTACHMENT DEVICE

(71) Applicant: ISUZU MOTORS LIMITED, Yokohama (JP)

(72) Inventor: Yohei Sasaki, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 275 days.

(21) Appl. No.: 18/277,488

(22) PCT Filed: Mar. 17, 2022

(86) PCT No.: PCT/JP2022/012323
§ 371 (c)(1),
(2) Date: Aug. 16, 2023

(87) PCT Pub. No.: WO2022/202617
PCT Pub. Date: Sep. 29, 2022

(65) Prior Publication Data
US 2024/0123926 A1   Apr. 18, 2024

(30) Foreign Application Priority Data
Mar. 24, 2021   (JP) .................. 2021-050621

(51) Int. Cl.
  *B60R 16/04*   (2006.01)
(52) U.S. Cl.
  CPC ................... *B60R 16/04* (2013.01)
(58) Field of Classification Search
  CPC .......... B60R 16/04; B60R 16/033; B60K 1/04
  (Continued)

(56) References Cited

U.S. PATENT DOCUMENTS 4,317,497 A  *  3/1982  Alt ................. H01M 50/209
                                              180/68.5
5,943,218 A  *  8/1999  Liu ................. H05K 7/1405
                                              361/801
(Continued)

FOREIGN PATENT DOCUMENTS

JP   S6451526 U   3/1989
JP   0622594 Y2   6/1994
(Continued)

OTHER PUBLICATIONS

PCT Search Report for International Application No. PCT/JP2022/012323 mailed Apr. 26, 2022, 7 pp.
(Continued)

*Primary Examiner* — Hau V Phan
(74) *Attorney, Agent, or Firm* — The Roy Gross Law Firm, LLC; Roy D. Gross

(57) ABSTRACT

The present invention is an in-vehicle equipment attaching device that attaches onboard equipment to a vehicle frame extending in the longitudinal direction of a vehicle by using a linking bracket. The bracket has a first side wall part that is secured to a frame-side wall section, a second side wall part that is installed facing the first side wall part and that is secured to the onboard equipment, and a third side wall part, the bracket forming an approximate U shape or H shape in cross-section such that the vehicle-rearward side thereof forms an open section. The bracket furthermore has first reinforcing ribs that are arranged between the first side wall part and the second side wall part, rear end sections of the ribs protruding further rearward than a rear end section of the second side wall part.

8 Claims, 7 Drawing Sheets

(58) Field of Classification Search
USPC .......................................................... 180/68.5
See application file for complete search history.

(56) References Cited

U.S. PATENT DOCUMENTS

| | | | | |
|---|---|---|---|---|
| 6,439,329 | B1* | 8/2002 | Vaishnav | ................ B60R 16/04 |
| | | | | 429/96 |
| 7,014,002 | B2* | 3/2006 | Mizuta | ................... B60R 16/04 |
| | | | | 180/68.5 |
| 7,398,849 | B2* | 7/2008 | Yoshida | .................. B60L 50/60 |
| | | | | 180/68.5 |
| 7,543,666 | B2* | 6/2009 | Connelly | ............ H01M 50/244 |
| | | | | 180/68.5 |
| 8,562,036 | B2* | 10/2013 | Zhou | ................... H01M 50/209 |
| | | | | 429/96 |
| 10,249,858 | B2* | 4/2019 | Konoura | ................. B60L 50/64 |
| 10,840,488 | B2* | 11/2020 | Izumi | ................. H01M 50/204 |
| 10,899,214 | B2* | 1/2021 | Sloan | ....................... B60K 1/04 |
| 11,043,714 | B2* | 6/2021 | Sloan | ....................... B60K 1/04 |
| 11,148,717 | B2* | 10/2021 | Alla | ....................... B62D 21/12 |
| 2009/0014224 | A1 | 1/2009 | Rydberg et al. | |
| 2018/0366703 | A1* | 12/2018 | Izumi | ................. H01M 50/249 |
| 2022/0169194 | A1* | 6/2022 | Plata | ..................... H01M 50/20 |
| 2022/0194198 | A1* | 6/2022 | Blomstrand | ............. B60K 1/04 |
| 2023/0068558 | A1* | 3/2023 | Akkur Ramabhadraiah | ............... B60R 16/033 |
| 2023/0113630 | A1* | 4/2023 | Chou | ...................... B60L 53/80 |
| | | | | 180/68.5 |

FOREIGN PATENT DOCUMENTS

| | | |
|---|---|---|
| JP | H11314583 A | 11/1999 |
| JP | 2005289240 A | 10/2005 |
| JP | 2009511333 A | 3/2009 |
| JP | 2012171379 A | 9/2012 |
| JP | 2016002864 A | 1/2016 |
| JP | 2017065381 A | 4/2017 |
| JP | 2018002063 A | 1/2018 |
| JP | 2018167596 A | 11/2018 |
| JP | 2020001527 A | 1/2020 |
| JP | 2021000942 A | 1/2021 |
| KR | 20190097674 A | 8/2019 |
| WO | 2007045365 A1 | 4/2007 |
| WO | 2017104034 A1 | 6/2017 |

OTHER PUBLICATIONS

PCT Written Opinion for International Application No. PCT/JP2022/012323 mailed Apr. 26, 2022, 3 pp.

* cited by examiner

ONBOARD EQUIPMENT ATTACHMENT DEVICE

CROSS REFERENCE TO RELATED APPLICATIONS

This application is a National Phase of PCT Patent Application No. PCT/JP2022/012323 having International filing date of Mar. 17, 2022, which claims the benefit of priority of Japanese Patent Application No. 2021-050621, filed Mar. 24, 2021, the contents of which are all incorporated herein by reference in their entirety.

TECHNICAL FIELD

The present disclosure relates to an in-vehicle equipment attaching device.

BACKGROUND ART

In vehicles such as trucks, various in-vehicle equipment such as a fuel tank, a battery, and an exhaust clarifying device is attached to the vehicle frame (see PTL 1).

As a device for attaching such in-vehicle equipment (hereinafter referred to as "in-vehicle equipment attaching device"), a device with a configuration in which the coupling bracket is disposed between the in-vehicle equipment and the side frame in the vehicle width direction so as to support the in-vehicle equipment and couple the in-vehicle equipment to the vehicle frame at a position outside the side frame in the vehicle width direction, and the like are known (see, for example, FIG. 1 described later).

CITATION LIST

Patent Literature

PTL 1
Japanese Patent Application Laid-Open No. 2020-001527

SUMMARY OF INVENTION

Technical Problem

In such vehicles, however, it is necessary to take into account the protection of the in-vehicle equipment in the event of vehicle collision in the design of the mounted state of the in-vehicle equipment.

The reason for this is that fire or the like may occur due to the damage of the in-vehicle equipment (for example, the fuel tank) in the event of vehicle collision.

Note that in the event of vehicle collision (here, collision at the vehicle front surface), each in-vehicle equipment attached to the vehicle frame is moved by the inertia force to the vehicle front side with respect to the vehicle frame, and therefore the design should especially take into account the contact between the pieces of the in-vehicle equipment arranged adjacent to each other in the front-rear direction and the like.

In view of this, as a coupling bracket of an in-vehicle equipment attaching device, a coupling bracket with a structure extending in the up-down direction and formed in a substantially U-cross-sectional shape or a substantially U-cross-sectional shape is employed in some cases (see, for example, FIG. 2 described later), for example.

Such a coupling bracket has an edge at the end portion on the vehicle rear side, and as such the edge may make contact with the in-vehicle equipment arranged on the vehicle rear side of the in-vehicle equipment attaching device and damage the in-vehicle equipment in the event of vehicle collision.

The simplest method for solving such a problem is to increase the thickness of the coupling bracket sheet to provide an edgeless coupling bracket, but such a method may lead to the increase in weight of the coupling bracket itself.

To solve the above-mentioned problems, an object of the present disclosure is to provide an in-vehicle equipment attaching device that can reduce a situation where the coupling bracket damages the in-vehicle equipment arranged on the vehicle rear side in the event of vehicle collision.

Solution to Problem

To solve the above-described problems, the main present disclosure is an in-vehicle equipment attaching device configured to attach an in-vehicle equipment to a vehicle frame extending in a front-rear direction of a vehicle by using a coupling bracket, and the coupling bracket includes: a first side wall part fixed to a frame side wall part of the vehicle frame in contact with the frame side wall part, a second side wall part arranged to face the first side wall part and fixed to the in-vehicle equipment, at a position outside the first side wall part in a vehicle width direction, and a third side wall part configured to connect the first side wall part and the second side wall part. With the first side wall part, the second side wall part, and the third side wall part, the coupling bracket has a substantially U-cross-sectional shape or a substantially H-cross-sectional shape that extends in an up-down direction and is open on a vehicle rear side. The coupling bracket further includes a first reinforcement rib approximately horizontally disposed between the first side wall part and the second side wall part. An end portion of the first reinforcement rib on the vehicle rear side protrudes to the vehicle rear side than an end portion of the second side wall part on the vehicle rear side.

Advantageous Effects of Invention

With the in-vehicle equipment attaching device according to the present disclosure, it is possible to reduce a situation where the coupling bracket damages the in-vehicle equipment arranged on the vehicle rear side in the event of vehicle collision.

DESCRIPTION OF EMBODIMENTS

The following is a detailed description of a suitable embodiment of the present disclosure with reference to the accompanying drawings. In this specification and the drawings, components that have substantially the same functions will be omitted from duplicated explanations by affixing the same symbols to them.

Note that in the following description, the front-rear direction, the vehicle width direction, and the up-down direction are described with respect to the vehicle travelling direction for the sake of clarity of the positional relationships of components. The front-rear direction means the front-rear direction of the vehicle travelling direction, the up-down direction means the vertical direction of the vehicle, and the vehicle width direction means the lateral direction of the vehicle orthogonal to the front-rear direction and the up-down direction.

Configuration of Vehicle Frame

First, the following describes a configuration of a vehicle frame for attaching an in-vehicle equipment attaching device according to the present disclosure (hereinafter referred to as "in-vehicle equipment attaching device 1").

Note that as an example, the following describes a configuration in which in-vehicle equipment attaching device 1 according to the present disclosure is applied to a use of attaching a battery to a vehicle frame.

It should be noted that the attaching object of in-vehicle equipment attaching device 1 according to the present disclosure may be objects other than batteries, such as exhaust clarifying devices and power conversion devices.

Figure 1:
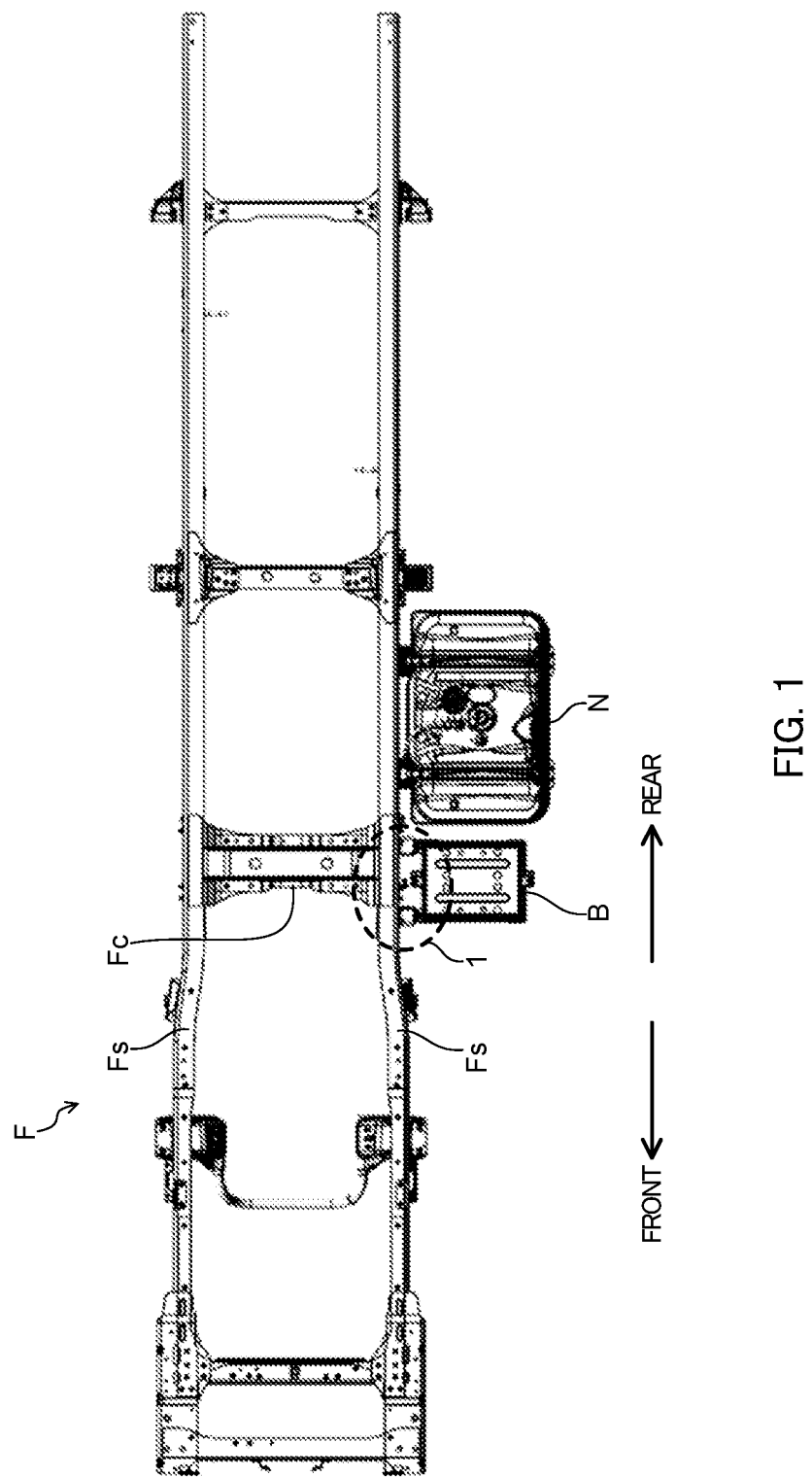
FIG. 1 is a plan view illustrating an external appearance of a vehicle frame.

FIG. 1 is a plan view illustrating an external appearance of vehicle frame F. FIG. 1 illustrates a vehicle frame for a truck as an example of vehicle frame F.

Vehicle frame F is a framework that supports a vehicle body (not illustrated) of a vehicle.

Vehicle frame F includes a pair of side frames Fs extending in the vehicle front-rear direction, and cross frame Fc that extends in the vehicle width direction and couples the pair of side frames Fs, for example.

Side frame Fs is formed of a steel sheet (also called groove steel) with a substantially U-cross-sectional shape, for example.

In side frame Fs, the inside of the substantially U-cross-sectional shape in the vehicle width direction is open, and a side wall part (hereinafter referred to as "frame side wall part Fsa") with a substantially planar shape is provided on the outside in the vehicle width direction, for example.

Figure 2:
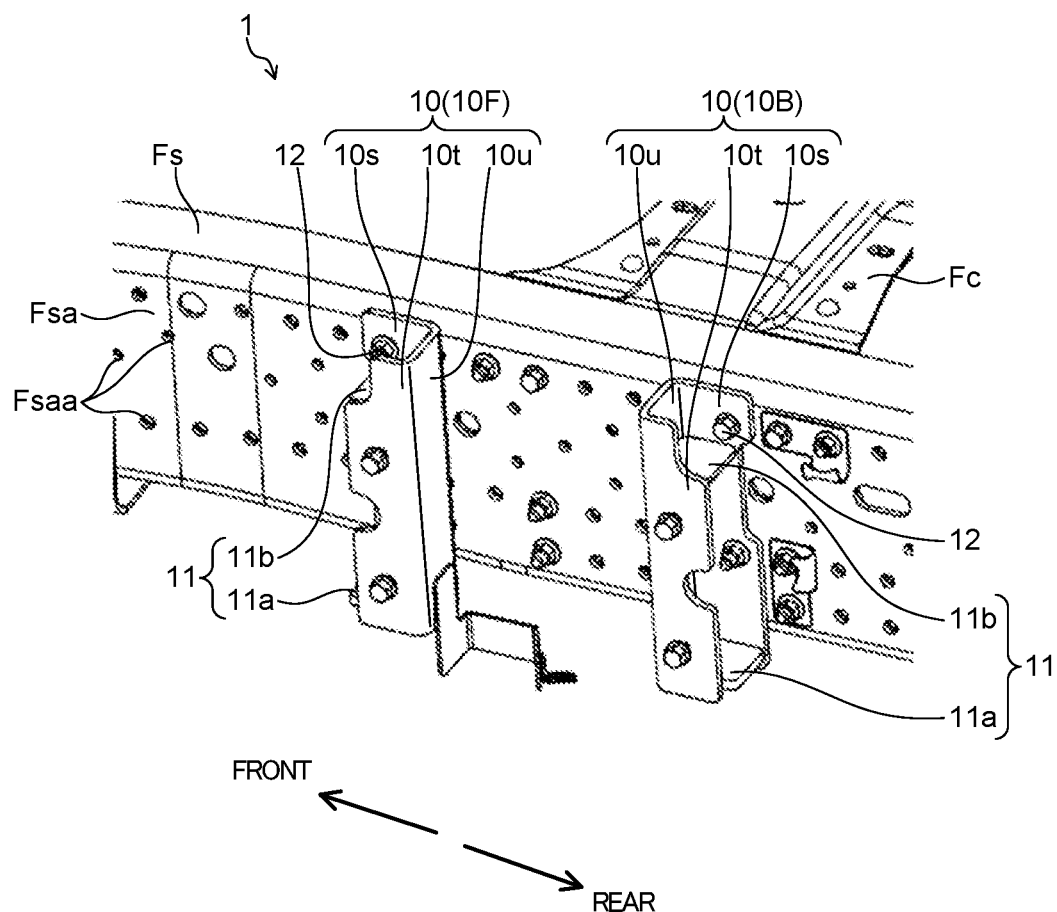
FIG. 2 is a diagram illustrating a specific configuration of an in-vehicle equipment attaching device.

In side frame Fs, a plurality of through holes Fsaa extending through frame side wall part Fsa of side frame Fs is formed (see FIG. 2).

Through holes Fsaa are formed in frame side wall part Fsa at an equal pitch. For example, the holes are arranged at a pitch of 40 cm along the vertical direction and the horizontal direction.

Through hole Fsaa is used as a bolt hole for inserting a bolt, for example.

The hole structure of side frame Fs is arranged such that various in-vehicle equipment can be attached to a given position in side frame Fs.

Note that a welding nut (not illustrated) for fastening with the bolt is provided at the surface on the inside of through hole Fsaa of frame side wall part Fsa in the vehicle width direction.

Battery B is attached to side frame Fs through in-vehicle equipment attaching device 1.

In addition, fuel tank N is attached adjacent to battery B on the rear side of battery B on the side frame Fs.

Note that further, various other in-vehicle equipment such as an exhaust clarifying device and a power conversion device (not illustrated) are attached to vehicle frame F.

Battery B is composed of battery main body Bm and battery carrier Bc (see FIG. 3), for example.

Battery carrier Bc is formed in a box shape, and battery main body Bm is housed inside in a detachable manner.

Battery carrier Bc includes attaching part Bca facing frame side wall part Fsa of side frame Fs on the inside in the vehicle width direction, and attaching part Bca is fixed to one end (second side wall part 10t of FIG. 2) of coupling bracket 10 of in-vehicle equipment attaching device 1.

Further, at a position separated from frame side wall part Fsa of side frame Fs on the outside in the vehicle width direction, battery carrier Bc is coupled with frame side wall part Fsa of side frame Fs through coupling bracket 10.

Note that a bolt hole for inserting bolt 13 is formed in attaching part Bca.

Specific Configuration of In-Vehicle Equipment Attaching Device 1

A specific configuration of in-vehicle equipment attaching device 1 is described below.

Figure 3:
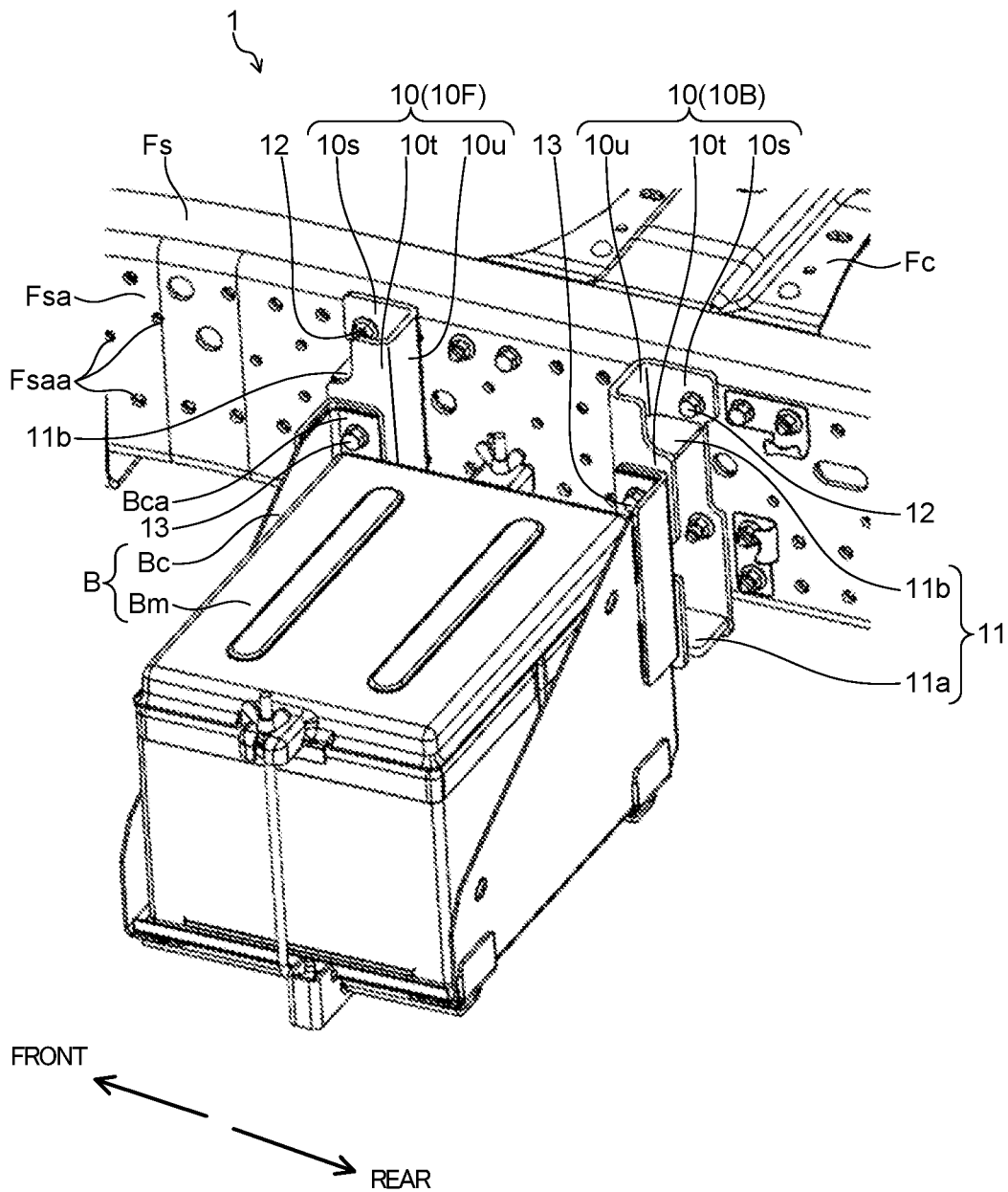
FIG. 3 is a diagram illustrating a specific configuration of the in-vehicle equipment attaching device.

FIGS. 2 and 3 are diagrams illustrating a specific configuration of in-vehicle equipment attaching device 1.

Note that FIG. 2 illustrates a state before battery B is attached to in-vehicle equipment attaching device 1, and FIG. 3 illustrates a state after battery B is attached to in-vehicle equipment attaching device 1.

Figure 4:
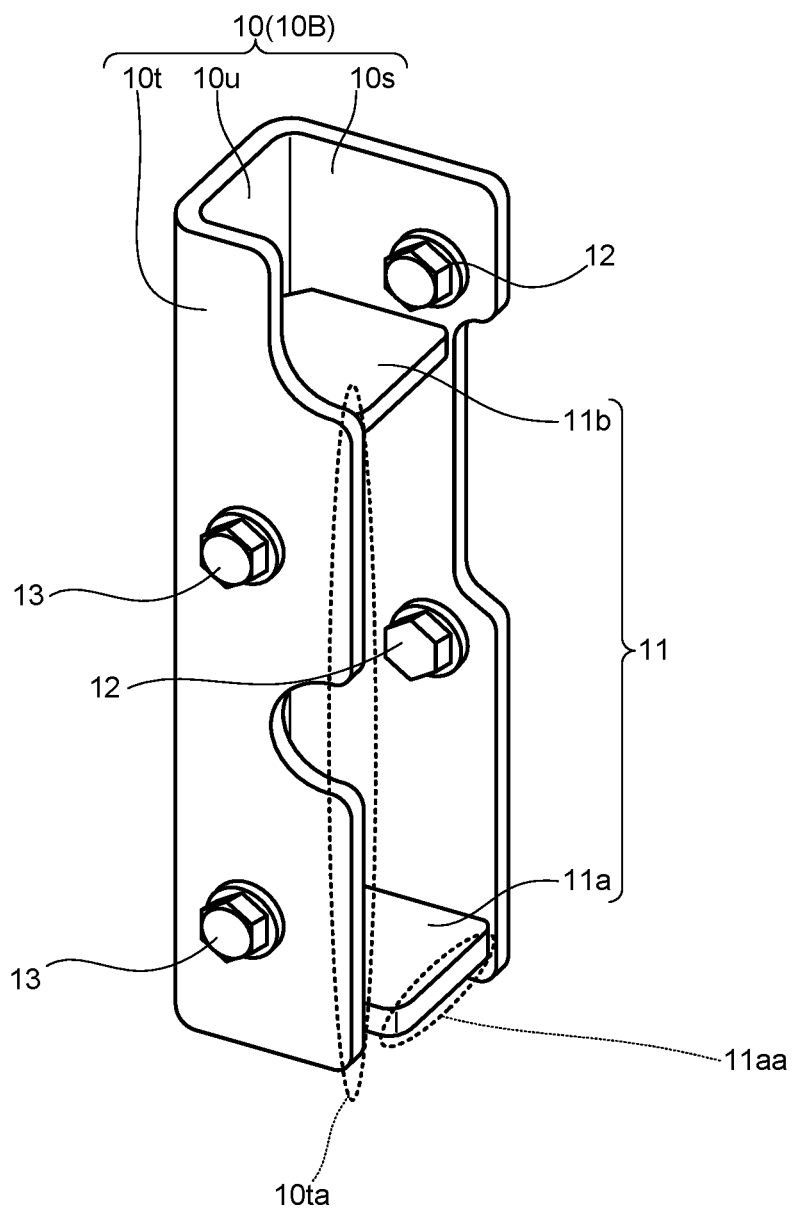
FIG. 4 is a diagram illustrating a specific configuration of a coupling bracket (only a rear coupling bracket is illustrated) of the in-vehicle equipment attaching device.

FIG. 4 is a diagram illustrating a specific configuration of coupling bracket 10 (here, only rear coupling bracket 10B is illustrated).

Note that for convenience of description, FIG. 4 illustrates a state where bolts 12 and 13 are inserted in the bolt holes formed in coupling bracket 10.

In-vehicle equipment attaching device 1 includes coupling bracket 10 as a main component, for example.

Further, coupling bracket 10 is arranged between battery B and side frame Fs in the vehicle width direction, so as to support battery B at a position outside side frame Fs in the vehicle width direction and couple battery B to side frame Fs.

More specifically, coupling bracket 10 is composed of rear coupling bracket 10B and front coupling bracket 10F arranged on the front and rear sides along the extending direction of side frame Fs.

Rear coupling bracket 10B and front coupling bracket 10F support the left and right sides of battery B (battery carrier Bc).

Rear coupling bracket 10B is formed of a steel sheet elongated in the up-down direction and bent in a substantially U-cross-sectional shape or a substantially H-cross-sectional shape (in the present embodiment, a U-cross-sectional shape), for example.

More specifically, rear coupling bracket 10B includes first side wall part 10s, second side wall part 10t, and third side wall part 10u, which form a substantially U-cross-sectional shape or a substantially H-cross-sectional shape (in the present embodiment, a U-cross-sectional shape) that extends in the up-down direction and is open on the vehicle rear side.

First side wall part 10s is a part having a shape extended along the wall surface of frame side wall part Fsa of side frame Fs, and fixed to frame side wall part Fsa of side frame Fs in contact with frame side wall part Fsa.

Note that a bolt hole is formed in first side wall part 10s, and first side wall part 10s is fixed to frame side wall part Fsa with insertion bolt 12 inserted through the bolt hole formed in first side wall part 10s itself, and through hole Fsaa formed in frame side wall part Fsa of side frame Fs.

Second side wall part 10t is a part having a shape along attaching part Bca of battery carrier Bc, and fixed to battery carrier Bc at a position outside first side wall part 10s in the vehicle width direction in contact with attaching part Bca of battery carrier Bc. Note that a bolt hole is formed in second side wall part 10t, and second side wall part 10t is fixed to battery carrier Bc with insertion bolt 13 inserted through the bolt hole formed in second side wall part 10t itself and the through hole formed in attaching part Bca of battery carrier Bc.

Third side wall part 10u is a part extending to the outside in the vehicle width direction from first side wall part 10s so as to connect first side wall part 10s and second side wall part 10t.

Third side wall part 10u extends along the vehicle width direction so as to connect the end portion of first side wall part 10s on the vehicle front side and the end portion of second side wall part 10t on the vehicle front side, for example.

In addition, rear coupling bracket 10B further includes at least one reinforcement rib 11 approximately horizontally disposed between first side wall part 10s and second side wall part 10t so as to maintain a constant shape of rear coupling bracket 10B.

Rear coupling bracket 10B according to the present embodiment includes lower reinforcement rib 11a and upper reinforcement rib 11b arranged side by side in the up-down direction between first side wall part 10s and second side wall part 10t.

Note that lower reinforcement rib 11a and upper reinforcement rib 11b are fixed by welding to the wall surface of first side wall part 10s and the wall surface of second side wall part 10t.

As with rear coupling bracket 10B, front coupling bracket 10F is formed of a steel sheet elongated in the up-down direction and bent in a substantially U-cross-sectional shape or a substantially H-cross-sectional shape, for example.

Front coupling bracket 10F has a shape that is bilaterally symmetric with respect to rear coupling bracket 10B, and includes first side wall part 10s, second side wall part 10t, third side wall part 10u as with rear coupling bracket 10B.

With first side wall part 10s, second side wall part 10t, and third side wall part 10u, front coupling bracket 10F is formed in a substantially U-cross-sectional shape or a substantially H-cross-sectional shape (in the present embodiment, a U-cross-sectional shape) that extends in the up-down direction and is open on the front side.

In addition, as with rear coupling bracket 10B, front coupling bracket 10F includes at least one reinforcement rib 11 approximately horizontally disposed between first side wall part 10s and second side wall part 10t so as to maintain a constant shape of front coupling bracket 10F.

Front coupling bracket 10F according to the present embodiment includes lower reinforcement rib 11a and upper reinforcement rib 11b arranged side by side in the up-down direction between first side wall part 10s and second side wall part 10t.

Note that the shape of coupling bracket 10 (rear coupling bracket 10B and front coupling bracket 10F) is designed in consideration of the standard size of battery B, the bolt fastening position to vehicle frame F, the stress resistance of coupling bracket 10, and the like.

In general, in the event of vehicle collision and/or vehicle driving, a large lateral (i.e., horizontal) moment centered on the attaching position of coupling bracket 10 of battery B acts on coupling bracket 10 from battery B due to the inertia force in association with the acceleration/deceleration of the vehicle.

Coupling bracket 10 according to the present embodiment adopts a structure in which first side wall part 10s and second side wall part 10t protrude to the left and right sides than the left and right end portions of battery B as viewed from battery B from the viewpoint of increasing the stress resistance against the lateral moment applied from battery B.

Now a specific structure of reinforcement rib 11 of coupling bracket 10 is described.

Figure 5:
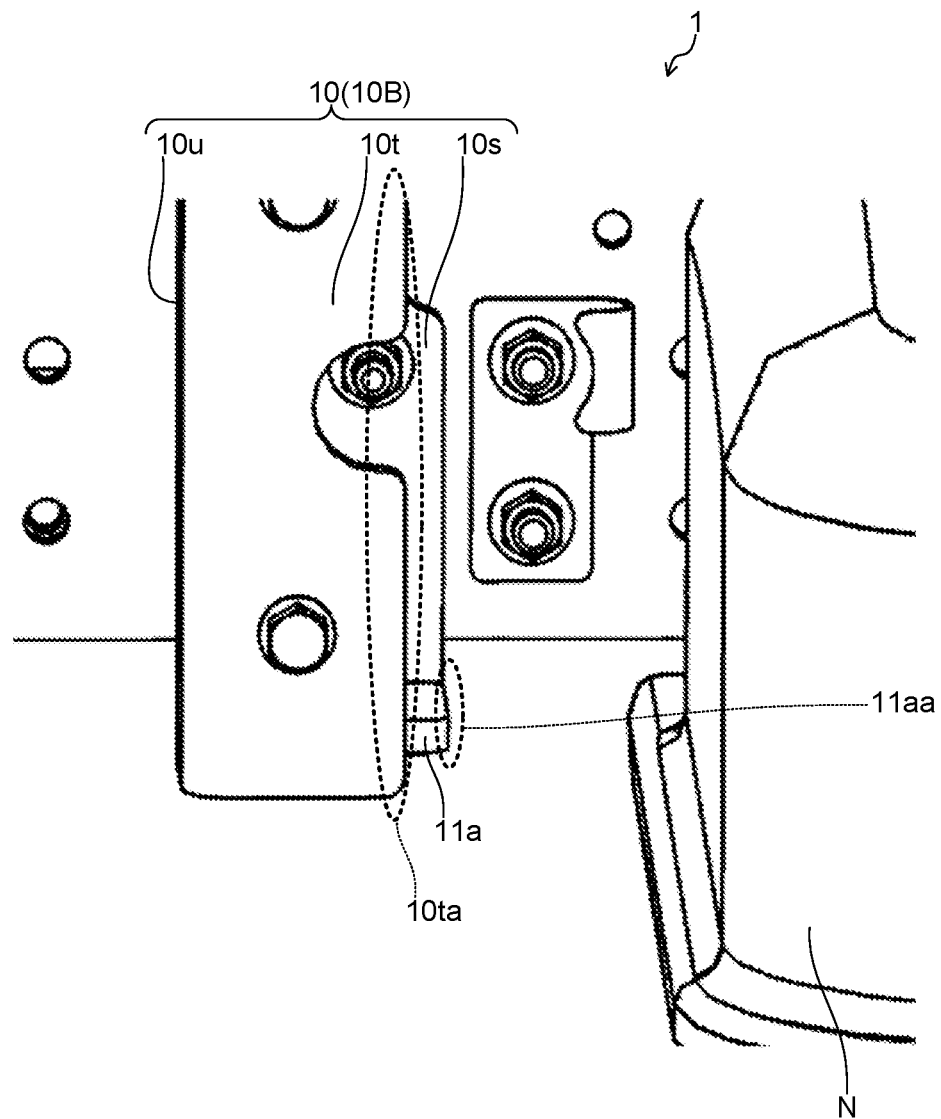
FIG. 5 is an enlarged view illustrating a specific configuration of a reinforcement rib provided in the coupling bracket.
Figure 6:
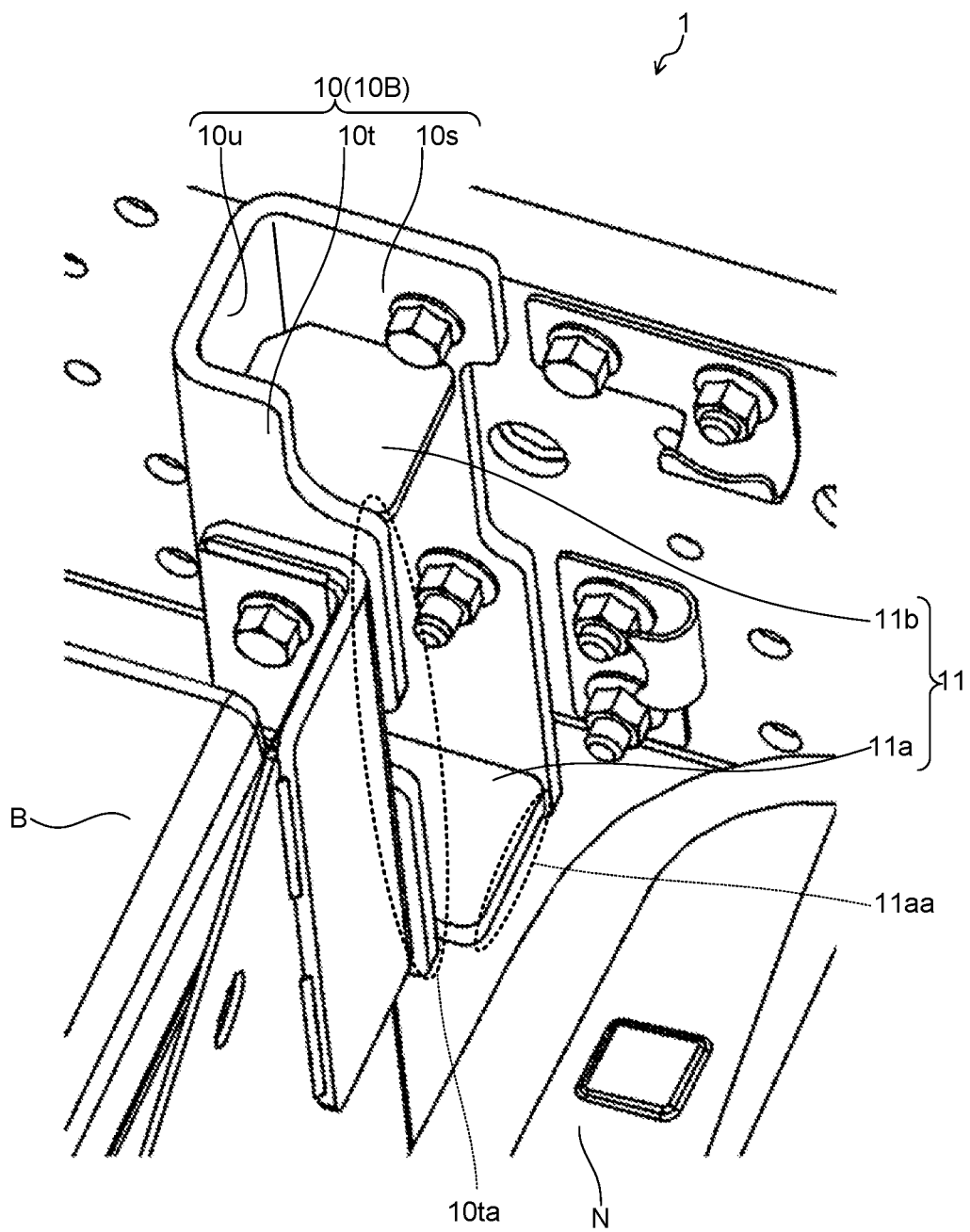
FIG. 6 is an enlarged view illustrating a specific configuration of the reinforcement rib provided in the coupling bracket.
Figure 7:
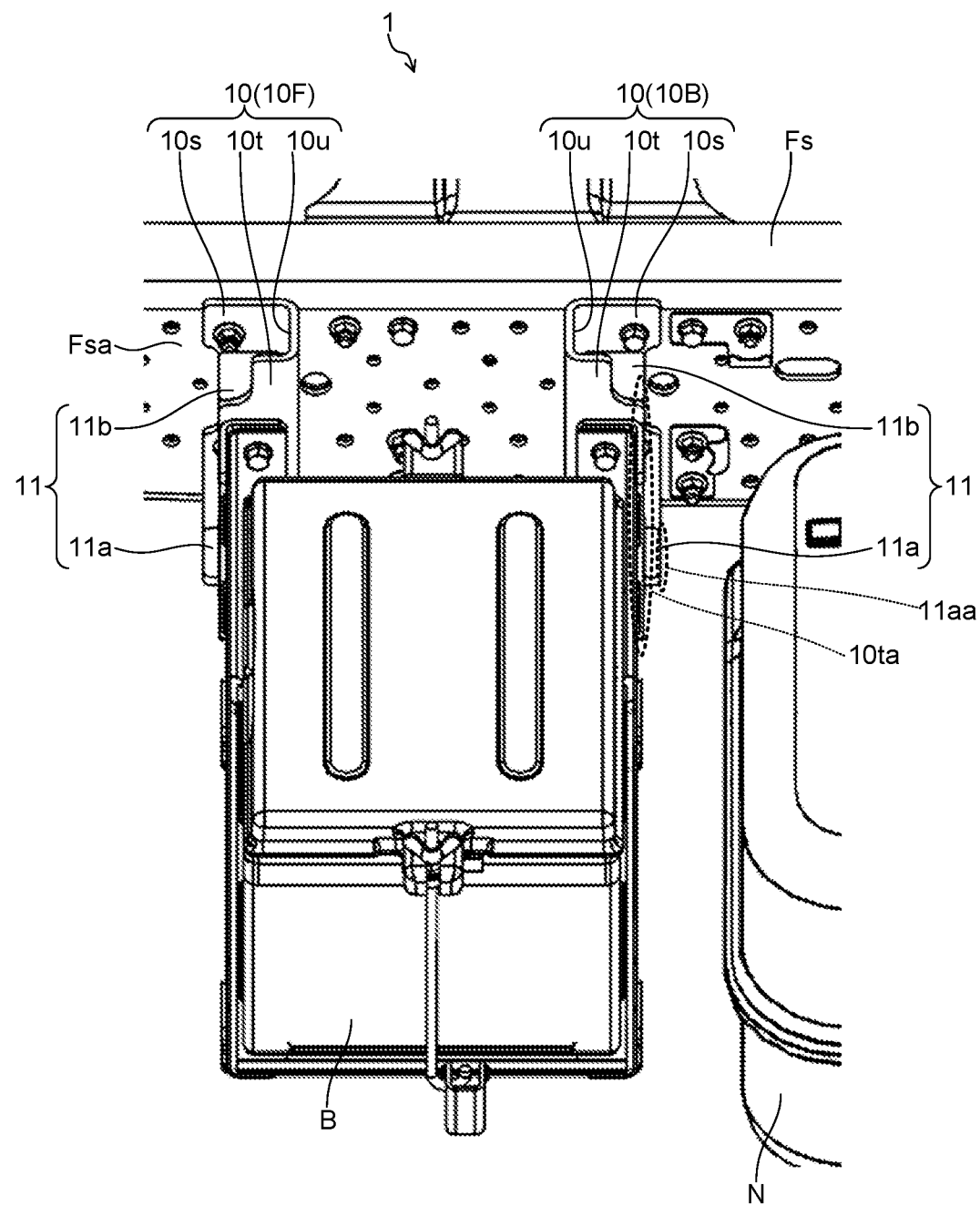
FIG. 7 is an enlarged view illustrating a specific configuration of the reinforcement rib provided in the coupling bracket.

FIGS. 5 to 7 are enlarged views illustrating a specific configuration of reinforcement rib 11 provided in coupling bracket 10.

Note that FIG. 5 is a diagram illustrating coupling bracket 10 as viewed from the lateral side (the outside in the vehicle width direction), FIG. 6 is a diagram illustrating coupling bracket 10 as viewed from an oblique upper side, and FIG. 7 is a diagram illustrating coupling bracket 10 as viewed from an oblique upper side.

In the event of vehicle collision (here, collision at the vehicle front surface), each in-vehicle equipment attached to side frame Fs is moved by the inertia force to the front side with respect to the attaching position of side frame Fs.

Therefore, for the design of the mounted state of the in-vehicle equipment, the contact between the pieces of in-vehicle equipment (here, battery B and fuel tank N) arranged adjacent to each other on the front and rear sides and the like should be taken into account in the design from a view point of protection of the in-vehicle equipment.

In view of this, in in-vehicle equipment attaching device 1 according to the present embodiment, rear end portion 10ta of second side wall part 10t of rear coupling bracket 10B (the end portion in the vehicle direction; the same shall apply hereinafter) is an edge, and the rear end portion 10ta protrudes rearward than battery B (battery carrier Bc). Therefore, in the event of vehicle collision, rear end portion 10ta of second side wall part 10t of rear coupling bracket 10B may make contact with fuel tank N, and damage fuel tank N.

Note that in in-vehicle equipment attaching device 1 according to the present embodiment, the rear end portion of first side wall part 10s of rear coupling bracket 10B is also an edge, and protrudes rearward than from battery B (battery carrier Bc).

However, first side wall part 10s is fixed to side frame Fs in contact with side frame Fs. Therefore, even in the event of vehicle collision, it is unlikely that first side wall part 10s makes contact with fuel tank N.

To reduce such a situation, in-vehicle equipment attaching device 1 according to the present embodiment has a configuration in which rear end portion 11aa (the end portion in the vehicle direction; the same shall apply hereinafter) of reinforcement rib 11 (here, lower reinforcement rib 11a) protrudes rearward than rear end portion 10ta of second side wall part 10t of rear coupling bracket 10B.

In this manner, in the event of vehicle collision, reinforcement rib 11 makes contact with fuel tank N first.

Thus, even when rear end portion 10ta of second side wall part 10t of rear coupling bracket 10B thereafter makes contact with fuel tank N, the impact of rear end portion 10ta of the second side wall part 10t exerted on fuel tank N can be reduced.

In addition, in the present embodiment, the sheet thickness of reinforcement rib 11 (here, lower reinforcement rib 11a) is greater than the sheet thickness of second side wall part 10t of rear coupling bracket 10B, and rear end portion 11aa of reinforcement rib 11 can be regarded as a single surface.

In the present embodiment, for example, the sheet thickness of second side wall part 10t of rear coupling bracket 10B is set to 5 mm or smaller in order to reduce the weight of rear coupling bracket 10B, while the sheet thickness of lower reinforcement rib 11a is set to 7 mm or greater.

Therefore, the maximum stress (i.e., the maximum stress that acts on one point due to stress concentration) that acts on fuel tank N when reinforcement rib 11 makes contact with fuel tank N is suppressed in comparison with the maximum stress that acts on fuel tank N when rear end portion 11aa of second side wall part 10t of rear coupling bracket 10B directly makes contact with fuel tank N.

Note that in in-vehicle equipment attaching device 1 according to the present embodiment, only lower reinforcement rib 11a (corresponding to "first reinforcement rib" of the present invention) protrudes rearward than rear end portion 10ta of second side wall part 10t of rear coupling bracket 10B, while upper reinforcement rib 11b does not protrude rearward than rear end portion 10ta of second side wall part 10t of rear coupling bracket 10B.

In addition, upper reinforcement rib 11b has a sheet thickness smaller than that of lower reinforcement rib 11a.

The reason for this is that upper reinforcement rib 11b is arranged near the upper end portion of fuel tank N, and as such the distance between upper reinforcement rib 11b and the expected contact position of fuel tank N is relatively large.

In other words, in the case where rear coupling bracket 10B is provided with a plurality of reinforcement ribs 11, it suffices that only reinforcement rib 11 (here, lower reinforcement rib 11a) that makes contact with fuel tank N in the event of vehicle collision among the plurality of reinforcement ribs 11 has a sheet thickness greater than that of second side wall part 10t of rear coupling bracket 10B, and protrudes rearward than rear end portion 10ta of second side wall part 10t of rear coupling bracket 10B.

This prevents the weight of coupling bracket 10 from unnecessarily increasing.

In addition, in the case where the sheet thickness of all of a plurality of reinforcement ribs 11 is set to a large value, the deformation flexibility of coupling bracket 10 (here, rear coupling bracket 10B) is reduced, and consequently the strength of coupling bracket 10 may be reduced in its entirety.

Effects

As described above, according to in-vehicle equipment attaching device 1 according to the present embodiment, in the event of vehicle collision, reinforcement rib 11 (in the above-mentioned embodiment, lower reinforcement rib 11a) makes contact with the in-vehicle equipment (in the above-mentioned embodiment, fuel tank N) adjacently arranged on the rear side of coupling bracket 10 (rear coupling bracket 10B) first, before rear end portion 10ta of second side wall part 10t of coupling bracket 10 (rear coupling bracket 10B).

This can suppress a situation where in the event of vehicle collision, the in-vehicle equipment is damaged by the edge of rear end portion 10ta of second side wall part 10t of coupling bracket 10 (rear coupling bracket 10B) making contact with the in-vehicle equipment adjacently arranged on the rear side of coupling bracket 10.

Note that the above-mentioned embodiment describes an example of a shape of coupling bracket 10 that can be applied to the present disclosure.

However, coupling bracket 10 with various shapes can be applied to in-vehicle equipment attaching device 1 according to the present disclosure.

For example, coupling bracket 10 does not necessarily have a configuration in which rear coupling bracket 10B and front coupling bracket 10F are separated from each other, and may have a configuration in which they are integrated with each other.

In addition, the above-mentioned embodiment describes vehicle frame F of a truck as an example of the object to which in-vehicle equipment attaching device 1 is applied.

However, in-vehicle equipment attaching device 1 according to the present disclosure may be applied to a vehicle frame other than that of trucks.

The specific examples of the invention have been described above in detail, but these are merely examples and do not limit the scope of the claims. The technology described in the claims includes various variations and modifications of the above-described specific examples.

This application is entitled to and claims the benefit of Japanese Patent Application No. 2021-50621 filed on Mar. 24, 2021, the disclosure each of which including the specification, drawings and abstract is incorporated herein by reference in its entirety.

INDUSTRIAL APPLICABILITY

The in-vehicle equipment attaching device according to the present disclosure can reduce a situation where the coupling bracket damages the in-vehicle equipment arranged on the vehicle rear side in the event of vehicle collision.

REFERENCE SIGNS LIST

1 In-vehicle equipment attaching device
10 Coupling bracket
10B Rear coupling bracket
10F Front coupling bracket
10s First side wall part
10t Second side wall part
10ta Rear end portion of second side wall part
10u Third side wall part
11 Reinforcement rib
11a Lower reinforcement rib
11aa Rear end portion of lower reinforcement rib
11b Upper reinforcement rib
12 Bolt
13 Bolt
B Battery
Bc Battery carrier
Bca Attaching part
Bm Battery main body
F Vehicle frame
Fc Cross frame
Fs Side frame
Fsa Frame side wall part
Fsaa Through hole

The invention claimed is:

1. An in-vehicle equipment attaching device configured to attach an in-vehicle equipment to a vehicle frame extending in a front-rear direction of a vehicle by using a coupling bracket,
wherein the coupling bracket includes:
a first side wall part fixed to a frame side wall part of the vehicle frame in contact with the frame side wall part,
a second side wall part arranged to face the first side wall part and fixed to the in-vehicle equipment, at a position outside the first side wall part in a vehicle width direction, and
a third side wall part configured to connect the first side wall part and the second side wall part,
wherein with the first side wall part, the second side wall part, and the third side wall part, the coupling bracket has a substantially U-cross-sectional shape or a substantially H-cross-sectional shape that extends in an up-down direction and is open on a vehicle rear side,
wherein the coupling bracket further includes a first reinforcement rib approximately horizontally disposed between the first side wall part and the second side wall part, and the first reinforcement rib is fixed to the wall surface of the first side wall part and the wall surface of the second side wall part each, and
wherein an end portion of the first reinforcement rib on the vehicle rear side protrudes to the vehicle rear side than an end portion of the second side wall part on the vehicle rear side.

2. The in-vehicle equipment attaching device according to claim 1, wherein a sheet thickness of the first reinforcement rib is greater than a sheet thickness of the second side wall part.

3. The in-vehicle equipment attaching device according to claim 1,
wherein the coupling bracket includes a plurality of reinforcement ribs arranged side by side in the up-down direction between the first side wall part and the second side wall part, and
wherein at least one reinforcement rib of the plurality of reinforcement ribs makes up the first reinforcement rib.

4. The in-vehicle equipment attaching device according to claim 3, wherein the first reinforcement rib of the plurality of reinforcement ribs has a sheet thickness greater than that of other reinforcement ribs.

5. The in-vehicle equipment attaching device according to claim 1, wherein the in-vehicle equipment is an in-vehicle battery.

6. The in-vehicle equipment attaching device according to claim 1, wherein a fuel tank is arranged adjacent to the in-vehicle equipment on the vehicle rear side of the in-vehicle equipment vehicle.

7. The in-vehicle equipment attaching device according to claim 1,
wherein the coupling bracket includes two separate brackets, the two separate brackets being a front coupling bracket and a rear coupling bracket arranged in a front-rear direction along an extending direction of the vehicle frame, and
wherein with the first side wall part, the second side wall part, and the third side wall part, the rear coupling bracket has a substantially U-cross-sectional shape or a substantially H-cross-sectional shape that extends in the up-down direction and is open on the vehicle rear side.

8. The in-vehicle equipment attaching device according to claim 1, wherein the end portion of the first reinforcement rib on the vehicle rear side protrudes to the vehicle rear side than an end portion of the in-vehicle equipment on the vehicle rear side.

* * * * *